UNITED STATES PATENT OFFICE.

ISAAC STANWOOD, OF GLOUCESTER, MASSACHUSETTS.

PROCESS OF OBTAINING ISINGLASS.

SPECIFICATION forming part of Reissued Letters Patent No. 9,715, dated May 17, 1881.

Original No. 177,764, dated May 23, 1876. Application for reissue filed April 15, 1878.

*To all whom it may concern:*

Be it known that I, ISAAC STANWOOD, of Gloucester, in the county of Essex and State of Massachusetts, have invented a new and Improved Process for Obtaining Isinglass; and I hereby declare the following to be a full, clear, and exact description thereof.

The object of my invention is to obtain from the skins of salted fish a marketable article of isinglass or gelatine.

With this end in view my invention consists in a certain process, and certain essential steps in the complete process, of treating salted fish-skins for the purpose of procuring their gelatine or isinglass in a liquid or dried form, as will be hereinafter described, and specified in the claims.

After the fish-skins are stripped I soak them in fresh water long enough to remove the salt. If the skins are not desired for immediate use, but are to be preserved for future use, they are then dried without removing the scales; but in the event that the skins are intended for immediate use it is not necessary, of course, to dry them, as the object of drying the skins is simply to preserve them until it is desired to treat them for extracting their gelatine or isinglass. Hence the first essential step in the process consists in desalting the salted fish-skins. Afterward the skins are thoroughly boiled, thereby removing the gelatine from the skins and obtaining a gelatinous solution, which is carefully strained, so as to allow the impurities to be removed, and afterward subjected to evaporation. If the liquid be allowed to stand, it will, after proper evaporation, become a solid mass. Any impurities which may have settled to the bottom of the receptacle are cut off and the pure mass cut into thin slices, which are laid on suitable surfaces to dry.

Having fully described my invention, what I claim as new, and desire to secure by Letters Patent, is—

1. In the process of obtaining gelatine from salted fish-skins, the method of producing a purified solution of gelatine, which consists in desalting the salted fish skins, boiling them in water, and straining the solution, or separating from it the superfluous matter or matters, substantially as set forth.

2. In the process of obtaining gelatine from salted fish-skins, the method of producing a solution of gelatine, which consists in desalting the salted fish-skins by soaking them in water, and then putting the skins in fresh water and boiling them, substantially as set forth.

3. The process, substantially as described, of obtaining gelatine from salted fish-skins, it consisting in desalting and boiling them, separating from the gelatinous solution so obtained the superfluous matter or matters, and reducing it (the solution) by evaporation to the necessary consistency for use, substantially as set forth.

4. The process of obtaining sheet-isinglass from salted fish-skins, which consists in soaking them in fresh water, boiling and straining off the liquid, causing it to evaporate to a compact mass, cutting it in slices, and afterward drying the slices, substantially as set forth.

ISAAC STANWOOD.

Witnesses:

THOMAS L. PUTNAM,

JOSEPH H. CALDWELL.